US010108481B1

(12) United States Patent
Kataria et al.

(10) Patent No.: US 10,108,481 B1
(45) Date of Patent: Oct. 23, 2018

(54) EARLY TERMINATION ERROR RECOVERY

(71) Applicant: Seagate Technology LLC, Cupertino, CA (US)

(72) Inventors: Abhay T Kataria, Longmont, CO (US); Mark A Gaertner, Vadnais Heights, MN (US)

(73) Assignee: Seagate Technology LLC, Cupertino, CA (US)

( * ) Notice: Subject to any disclaimer, the term of this patent is extended or adjusted under 35 U.S.C. 154(b) by 87 days.

(21) Appl. No.: 15/047,490

(22) Filed: Feb. 18, 2016

(51) Int. Cl.
G06F 11/00 (2006.01)
G06F 11/07 (2006.01)

(52) U.S. Cl.
CPC ........ *G06F 11/0793* (2013.01); *G06F 11/073* (2013.01); *G06F 11/0727* (2013.01)

(58) Field of Classification Search
USPC .................. 714/6.12, 16, 2, 15, 20
See application file for complete search history.

(56) References Cited

U.S. PATENT DOCUMENTS

| 5,490,149 | A | 2/1996 | Nylander-Hill |
| 6,061,805 | A | 5/2000 | Suzuki et al. |
| 7,003,689 | B2 | 2/2006 | Arakawa |
| 7,490,259 | B2 * | 2/2009 | Saitoh ................ G06F 11/0727 711/114 |
| 2014/0351627 | A1 * | 11/2014 | Best .................... G06F 11/2053 714/6.11 |

* cited by examiner

*Primary Examiner* — Dieu-Minh Le
(74) *Attorney, Agent, or Firm* — Cesari & Reed, LLP; Kirk A. Cesari; Christian W. Best

(57) ABSTRACT

Systems and methods are disclosed to perform early termination error recovery at a data storage device. A data storage device may be configured to perform error recovery operations in response to encountering an error while executing a host command, and terminate the error recovery operations prior to completion based on an error recovery time limit. Based on early termination of the error recovery operations, the storage device can add a storage location corresponding to the error to a scan list of storage locations on which to perform additional error recovery operations. In some embodiments, the host may set the error recovery time limit.

20 Claims, 10 Drawing Sheets

400

| Sector Monitor List | | | |
|---|---|---|---|
| Sector | Error counter | Early exit recovery | Recovery status |
| 739 | 2 | 0 | Process C |
| 2247 | 6 | 1 | Process B |
| 3099 | 1 | 1 | Process C |

| Error recovery process list | |
|---|---|
| Error recovery process | Disc revolutions |
| Process A | 1 |
| Process B | 3 |
| Process C | 2 |
| Process D | 5 |
| Process E | 3 |

EARLY TERMINATION ERROR RECOVERY

SUMMARY

In certain embodiments, an apparatus may comprise a memory device having a controller configured to execute a read command from a host at a physical storage location associated with the read command. The controller may also perform one or more error recovery operations in response to encountering a read error while executing the read command, cancel the one or more error recovery operations based on reaching an error recovery time limit set based on an indication from the host, and add the physical storage location to a scan list based on reaching the error recovery time limit. The scan list can include a list of physical storage locations on which to perform additional error recovery operations.

In certain embodiments, a memory device may store instructions that, when executed, cause a processor to perform a process. The process can include receiving a command from a host, performing one or more error recovery operations in response to encountering an error while executing the command, terminating the one or more error recovery operations when an error recovery time limit is reached prior to completion of the one or more error recovery operations, and adding a physical storage location corresponding to the error to a scan list based on reaching the error recovery time limit. The scan list can include a list of physical storage locations on which to perform additional error recovery operations on a deferred basis.

In certain embodiments, a method may comprise receiving a command from a host at a data storage device, and performing one or more error recovery operations in response to encountering an error while executing the command. The method may also include terminating the one or more error recovery operations when an error recovery time limit is reached prior to completion of the one or more error recovery operations, and adding a physical storage location corresponding to the error to a scan list based on reaching the error recovery time limit. The scan list may include a list of physical storage locations on which to perform delayed error recovery operations.

BRIEF DESCRIPTION OF THE DRAWINGS

FIG. 4 is a diagram of table employed by a system configured to perform early termination error recovery, in accordance with certain embodiments of the present disclosure;

FIG. 10 is a diagram of table employed by a system configured to perform early termination error recovery, in accordance with certain embodiments of the present disclosure.

DETAILED DESCRIPTION

In the following detailed description of certain embodiments, reference is made to the accompanying drawings which form a part hereof, and in which are shown by way of illustration of example embodiments. Features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a processor or controller device. Dedicated hardware implementations including, but not limited to, application specific integrated circuits, programmable logic arrays, and other hardware devices can likewise be constructed to implement the methods and functions described herein. Further, the methods described herein may be implemented as a computer readable storage medium or memory device including instructions that when executed cause a processor to perform the methods.

Figure 1:
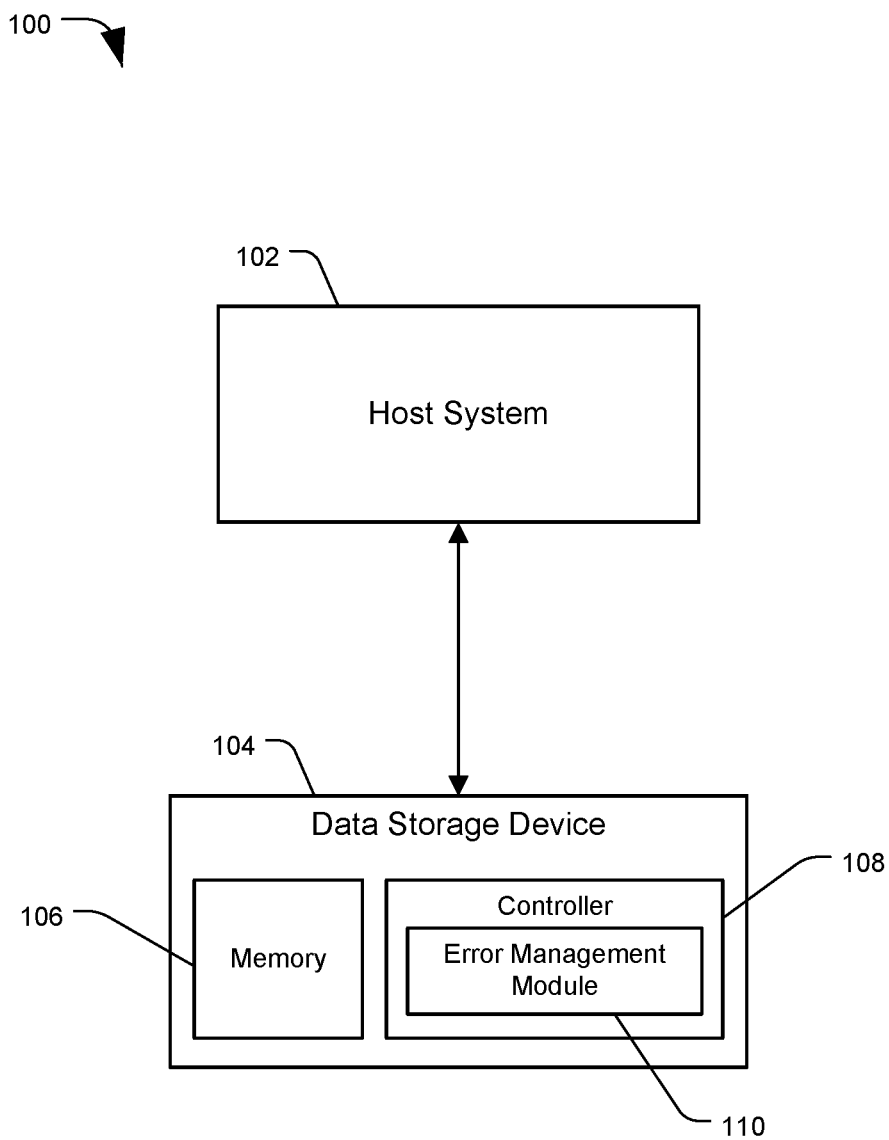
FIG. 1 is a diagram of a system configured to perform early termination error recovery, in accordance with certain embodiments of the present disclosure.

FIG. 1 is a diagram of a system 100 configured to perform early termination error recovery, in accordance with certain embodiments of the present disclosure. The system 100 may include a host 102 and a data storage device (DSD) 104. The host 102 may also be referred to as the host system or host computer. The host 102 can be a desktop computer, a laptop computer, a server device, a tablet computer, a telephone, a music player, another electronic device, or any combination thereof. Similarly, the DSD 104 may be any of the above-listed devices, or any other device which may be used to store or retrieve data, such as a disc drive, solid state drive, hybrid drive, or any combination thereof. The host 102 and DSD 104 may be connected by way of a wired or wireless connection, including by a local area network (LAN) or wide area network (WAN). In some embodiments, the DSD 104 can be a stand-alone device not integrated into a host 102 (e.g. a removable data storage device having its own case or housing), or the host 102 and DSD 104 may both be part of a single unit (e.g. a computer having an internal hard drive).

The DSD 104 may include a memory 106 and a controller 108. The DSD 104 may receive a data read or write request from the host device 102, and use the controller 108 to perform data operations on the memory 106 based on the request. The memory 106 may comprise magnetic storage media such as disc drives, nonvolatile solid state memories such as Flash memory, other types of memory, or a combination thereof. The controller 108 may comprise one or more circuits or processors configured to control operations of the data storage device 104, such as storing data to or retrieving data from the memory 106.

Data may be stored to memory 106 in units of physical storage locations, sometimes referred to as "sectors" or "data sectors". Data sectors may be associated with particular LBAs (logical block addresses), based on the logical addresses used to reference the data stored to the data sectors.

DSD 104 may encounter errors when reading data from memory 106 due to a variety of factors. For example, the storage medium of memory 106 may have a physical defect at one or more physical storage locations. In another example, the DSD 104 may have been bumped during read or write operations, causing the transducer head to become misaligned with a track.

DSD 104 may be configured to perform error recovery operations to attempt to recover written data when an initial read attempt fails. However, error recovery operations may take time, and may delay completion of the read command or the return of a read failure indication to the host. In some embodiments it may be desirable to complete a read operation quickly, either by successfully returning the requested data, or by returning a failure indication. For example, the host device 102 may be able to access the requested data from another mirrored data storage device more quickly than waiting for the first device to finish performing error recovery operations. In another example, the host 102 may require low latency, such as for streaming video or audio data, and may prefer to skip some data rather than causing streaming delays. In such embodiments it may be more efficient to receive a read failure from a device than it would be to wait for the device to perform "deep" or "heroic" error recovery operations. Deep or heroic error recovery techniques or operations may include operations employed when data cannot be recovered using error correction codes (ECC) or similar "fast" error correction techniques. Deep or heroic correction may require multiple disc revolutions, attempting various track-head offset settings, adjusting channel parameters, adjusting other read parameters, testing sectors for physical defects, other "slow" correction techniques, or any combination thereof. The DSD 104 may be configured to implement a short or variable error recovery time limit to ensure that a command response is provided to the host 102 within a selected time frame.

Accordingly, DSD 104 may include an error management module (EMM) 110. A "module" may be one or more physical components of a computing device (e.g., one or more circuits, processors, or any combination thereof) configured to perform a particular task or job, or it may be a program that, when executed, causes a processor to perform the particular task or job. The EMM 110 may control error recovery operations for read or write errors based on an error recovery time limit. Error recovery operations may include re-trying an operation, adjusting parameters of an operation (e.g. adjust a head position relative to a track to attempt to read data which may be recorded off-center), performing different data decoding operations, attempting to reconstruct data using stored parity bits or redundant data, other operations, or any combination thereof. The EMM 110 may be part of or executed by controller 108, integrated with a servo control system, incorporated into other components of the DSD 104, or any combination thereof.

The DSD 104 may be configured to receive indications from the host 102 to control an error recovery time limit of the DSD 104. The error recovery time limit may be a time limit within which the DSD 104 is required to return a response to a host command, or a time limit that the DSD 104 is permitted to devote to error recovery operations while a host command is pending. The error recovery time limit may begin from when a command is received from the host, or it may be a limit on additional time that the DSD 104 may devote to error recovery procedures above a normal execution time. For example, the DSD 104 may receive a command and store it in a command queue pending execution. In embodiments where the error recovery time limit begins from when the command was received, time the command waits in the queue counts against the total time the DSD 104 may spend on command execution and error recovery operations. In embodiments where the error recovery time limit designates an error recovery period, the time limit may only begin after the command has been retrieved from the queue and an execution attempt resulted in an error.

Default error recovery time limits may be set by a manufacturer of the DSD 104, for example pursuant to a request from a client or industry demands. Error recovery time limits may also be set based on indications received from the host 102. The host 102 may designate a long error recovery time limit in order to allow the DSD 104 to perform extensive error recovery operations, to achieve a high likelihood of recovering the requested data. The host 102 may alternately set a short error recovery time limit to force a rapid response from a data storage device 104. The EMM 110 may store an indication of the error recovery time limit, and manage error recovery operations so as to not exceed the limit. For example, the EMM 110 may cancel ongoing error recovery operations when the error recovery time limit is reached, or may prevent execution of further error recovery operations when the EMM 110 determines that those operations will not complete before the error recovery time limit is reached.

If a data storage device 104 is prevented from performing a full set of error recovery operations due to a low error recovery time limit, the DSD 104 may not be able to determine whether the data is recoverable, whether the error was due to defects in the storage medium itself, or other important information. When the reliability of a sector has not been determined, the DSD 104 may continue attempting to write data to or read data from a bad sector, resulting in operational inefficiency or potential loss of data.

Accordingly, the EMM 110 may be configured to maintain a scan list or other log of sectors at which errors were encountered and that did not receive full error scans due to a low error recovery time limit. The scan list may be accessed to determine which sectors to return to and perform additional error scanning operations on. These additional error scanning operations may be performed independently by the DSD 104, and not as part of a host read or write command. For example, the DSD 104 may determine when the DSD 104 is in an idle state (e.g. no pending host commands, or a low quantity of pending commands, etc.), and perform error recovery operations on sectors in the scan list.

The host 102 may also be able to initiate error recovery operations on sectors in the scan list. The host 102 may send a request to the DSD 104 for an indication of whether any sectors are on a scan list and require scanning, may request a copy of the scan list itself, or may otherwise obtain information from the DSD 104 about whether sectors require scanning. The host 102 may then determine when or if to initiate error recovery operations, such as by sending a command to the DSD 104 to perform error recovery operations on sectors on the scan list.

Figure 2:
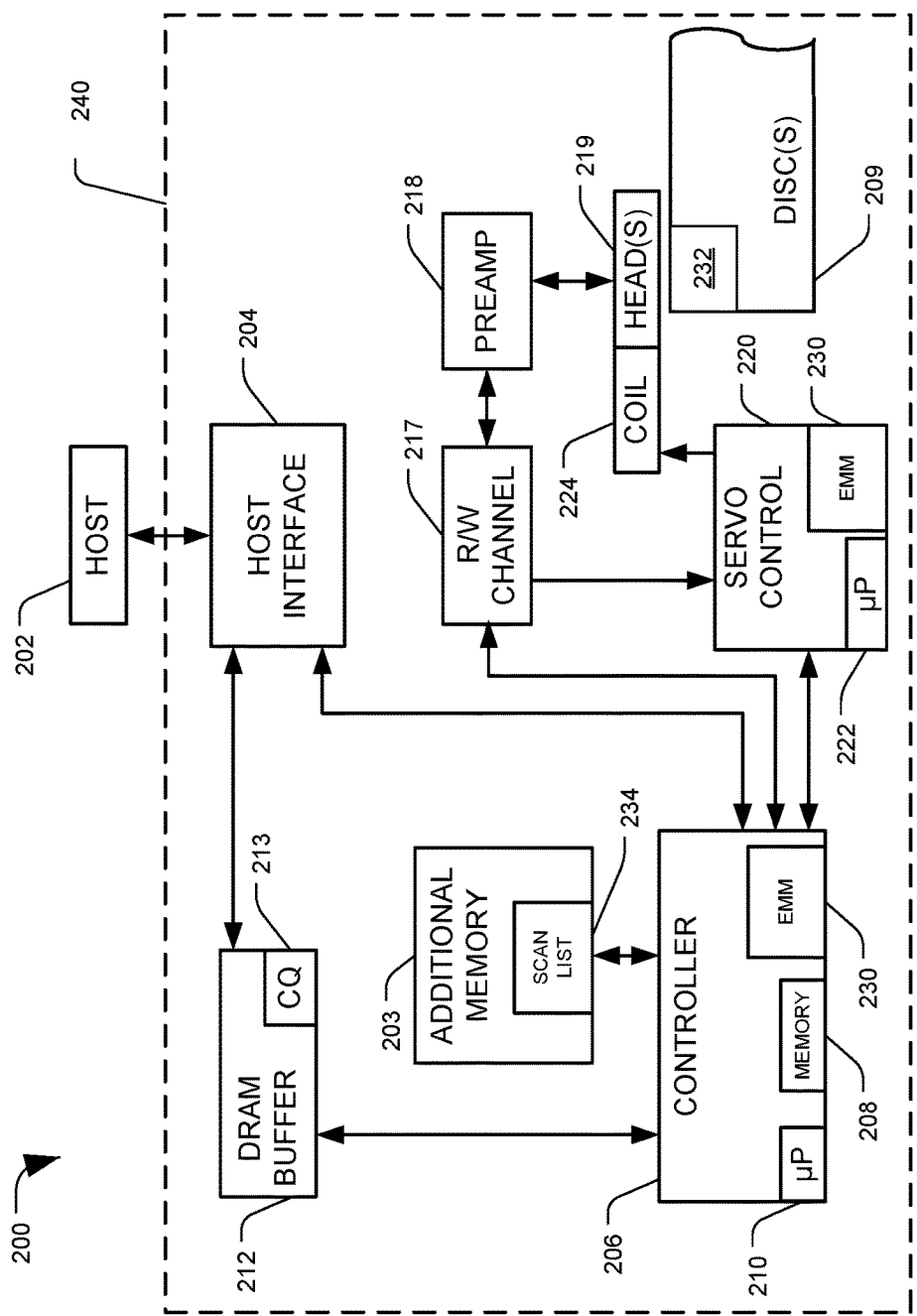
FIG. 2 is a diagram of a system configured to perform early termination error recovery, in accordance with certain embodiments of the present disclosure.

FIG. 2 is a diagram of a system configured to perform early termination error recovery, in accordance with certain embodiments of the present disclosure. Specifically, FIG. 2 provides a functional block diagram of an example data storage device (DSD) 200, such as the device 104 shown in FIG. 1. The DSD 200 can communicate with a host device 202 (such as the host system 102 shown in FIG. 1) via a hardware or firmware-based interface circuit 204. The interface 204 may comprise any interface that allows communication between a host 202 and a DSD 200, either wired or wireless, such as Universal Serial Bus (USB), IEEE 1394 (Institute of Electrical and Electronics Engineers standard 1394), Compact Flash, Serial AT Attachment (SATA), external SATA (eSATA), Parallel ATA (PATA), Small Computer System Interface (SCSI), Serial Attached SCSI (SAS), Peripheral Component Interconnect Express (PCIe), Fibre Channel, Ethernet, or Thunderbolt, among others. The interface 204 may include a connector that allows the DSD 200 to be physically removed from the host 202. In some embodiments, the DSD 200 may have a casing or housing 240 containing the components of the DSD 200 as a device separate from and external to the host 202. The DSD 200 may communicate with the host 202 through the interface 204 over wired or wireless communication.

The buffer 212 can temporarily store data during read and write operations, and can include a command queue (CQ) 213 where multiple pending operations can be temporarily stored pending execution. Commands arriving over the interface 204 may automatically be received in the CQ 213 or may be stored there by controller 206, interface 204, or another component.

The DSD 200 can include a programmable controller 206, which can include associated memory 208 and processor 210. In some embodiments, the DSD 200 can include a read-write (R/W) channel 217, which can encode data during write operations and reconstruct user data retrieved from a memory, such as disc(s) 209, during read operations. A preamplifier circuit (preamp) 218 can apply write currents to the head(s) 219 and provides pre-amplification of readback signals. A servo control circuit 220 may use servo data to provide the appropriate current to the coil 224, sometimes called a voice coil motor (VCM), to position the head(s) 219 over a desired area of the disc(s) 209. The controller 206 can communicate with a processor 222 to move the head(s) 219 to the desired locations on the disc(s) 209 during execution of various pending commands in the command queue 213.

In some embodiments, the DSD 200 may include other types of memory instead of or in addition to disc memory 209. For example, the DSD 200 can include an additional memory 203, which can be either volatile memory such as dynamic random-access memory (DRAM) or static random access memory (SRAM), or non-volatile memory such as NAND Flash memory. In some embodiments the additional memory 203 can function as a cache and store recently or frequently read or written data, or data likely to be read soon. Additional memory 203 may also function as main storage instead of or in addition to disc(s) 209. A DSD 200 containing multiple types of nonvolatile storage mediums, such as a disc(s) 209 and Flash 203, may be referred to as a hybrid storage device.

DSD 200 may include an error management module (EMM) 230, which may correspond to error management module 110 of FIG. 1. The EMM 230 may manage error recovery operations for the DSD 200, monitor error recovery time limits, manage lists of sectors requiring addition error scanning, perform other functions, or any combination thereof. The EMM 230 may be a processor, controller, or other circuit, or it may be a set of software instructions that, when executed by a processing device, perform the functions of the EMM 230. In some embodiments, the EMM 230 may be part of or executed by controller 206, part of or executed by servo control circuit 220, distributed between multiple components of the DSD 200, a standalone component, or any combination thereof.

The DSD 200 may receive a command from the host 202 via the host interface 204. For example, the host 202 may send a read command to retrieve specified data corresponding to a logical block address (LBA) included with the read command. The DSD 200 may attempt to read the specified data from the discs 209. Executing a read command may include determining a data sector 232 on the discs 209 corresponding to the LBA received from the host 202, such as by using a mapping table stored to a memory (e.g. memory 208 or buffer 212). The DSD 200 may encounter an error when attempting to read the specified data. For example, the DSD 200 may be unable to decode the signal read from the data sector 232. The EMM 230 may initiate error recovery operations to attempt to obtain the specified data. Error recovery operations may include applying different data decoding routines, attempting to re-read the sector 232 on a subsequent revolution of the discs 209, adjusting a position of the head 219 relative to the disc 209, attempting to rebuild the specified data using parity bit data stored at the DSD 200, employing other operations, or any combination thereof.

Some error recovery operations may include attempting to determine whether a sector 232 is defective. One method may include writing data to the sector 232 and attempting to read the data back for verification, in a read-verify operation. If the read-verify operation fails (e.g. after writing, the DSD 200 was not able to successfully read the data in one attempt, or a set threshold number of times), the EMM 230 may determine that sector 232 includes a defect and is not reliable for storing data. The EMM 230 may create a more stringent testing environment by lowering the channel correction level during the read back, reducing the number of errors that can be automatically corrected during a read data transfer. The EMM 230 may employ other operations to determine whether sector 232 is defective in addition to, or instead of, performing read-verify operations. If the EMM 230 determines that sector 232 is defective, the EMM 230 may add the sector 232 to a bad sector list, and redirect data reads and writes to the sector 232 to a different spare sector.

The DSD 200 may be configured to have an adjustable error recovery time limit. A manufacturer of the DSD 200 may set different error recovery time limits for a same model of DSD based on requests from specific customers or industry data access needs. The DSD 200 may receive an error recovery time limit indication from the host 202 at the host interface 204 and provide a notification to the controller 206 or EMM 230 to modify or set an error recovery time limit in response to the indication.

The DSD 200 may receive an indication or command from the host 202 to set the error recovery time limit to a specified duration. In some embodiments the DSD 200 may receive commands from the host 202 to set a global error recovery time limit for the DSD 200 to apply to all commands, to set a global error recovery time limit for specified types of commands (e.g. for all read commands), to set an error recovery time limit for individual commands, to set other error recovery time limits, or any combination thereof. For example, the DSD 200 may be configured to receive individual commands (e.g. a read command) including an error recovery time limit indicator, setting an error recovery time limit to be applied while servicing the corresponding command but not affecting other commands; thus, the error recovery time limit indicator may be command specific. The host 202 may also issue a command to configure settings of the DSD 200 using storage device diagnostic protocols or other configuration commands. In an example embodiment, SMART (self-monitoring, analysis, and reporting technology) monitoring systems in data storage devices may have associated control commands, or SCT (SMART command transport) commands. The host 202 may transmit an SCT command to set an error recovery time limit applied by the DSD 200.

The DSD 200 may be configured to obtain an indication of the error recovery time limit from the host 202. The DSD 200 may send a request to the host 202 to specify a time limit, for example in response to receiving an input/output (I/O) command from a host, or during an initialization phase when the DSD 200 is powered on or connected to the host 202. The DSD 200 may optionally set the error recovery time limit based on monitoring host 202 activity. For example, drivers may be installed at the host 202 which monitor host processing workload, the type of processing (e.g. video or other data streaming), or other host information. The drivers may send indications to the DSD 200, or the DSD 200 can send information requests to the drivers. The received information can be used by the DSD 200 to select an error recovery time limit. In some embodiments, the DSD 200 may determine the type or nature of the host 202, for example during an interfacing phase. The DSD 200 may be configured to set the error recovery time limit based on identifying information received from the host.

In some embodiments, the DSD 200 may return a failure notification to the host 202 when a command fails to complete. The failure notification may include an indication that error recovery operations were terminated early due to the error recovery time limit applied to the command. In some embodiments, the host 202 may resubmit a command in response to receiving the failure notification, and the host 202 may include an indication that the DSD 200 should apply a longer error recovery time limit. For example, the host 202 may set a maximum length error recovery time limit to direct the DSD 200 to attempt all available error recovery operations if a first operation failed.

The EMM 230 may control error recovery operations based on the specified error recovery time limit. The EMM 230 may cancel error recovery operations when the error recovery time limit is reached, or before the time limit is reached. For example, the EMM 230 may initiate a sequence of error recovery operations while monitoring the error recovery time limit, and abort whatever error recovery operation is executing when the time limit is reached. In some embodiments, the EMM 230 may estimate an amount of time each error recovery operation will require to complete, and may cease error recovery operations early if the next operation will not be able to complete before the error recovery time limit is reached. For example, the EMM 230 may be aware of a number of disc revolutions a particular recovery operation is expected to take, and may multiply the number of revolutions by a known time to complete a revolution to determine an estimated time to complete each recovery operation. In another example, the estimated time values for recovery operations may be stored to a memory and may not require any additional calculations. Estimates may be modified based on the amount of data requested, the number of errors encountered, other factors, or any combination thereof.

The EMM 230 may be configured to implement a variety of error recovery operations. In some embodiments, the error recovery operations may be implemented in a set sequence for a given command type or error type. For example, following a read error, the EMM 230 may first attempt additional decoding or error correction algorithms on the read data, followed by performing a standard re-read operation, followed by attempting re-reads at different head offsets, or attempting data reconstruction using super parity data, etc. The EMM 230 may proceed through each operation in the set sequence until the data is recovered or the error recovery time limit is reached. Rather than performing recovery operations in a set order, the EMM 230 may calculate what error recovery operations to perform based on the available error recovery time limit. For example, if both a first operation and a second operation cannot be completed within the error recovery time limit, the EMM 230 may opt to skip the first operation in favor of performing the second operation.

The EMM 230 may generate a log or list 234 of sectors for which the error recovery operations were prematurely terminated due to the error recovery time limit. The scan list 234 may identify a data sector, an LBA associated with a data sector, details about the error (e.g. when the error occurred, recovery operations previously attempted, a number of errors detected for the sector, etc.), other metadata about the error, or any combination thereof. After error recovery operations were prematurely terminated due to an error recovery time limit, the DSD 200 may consult the scan list 234 to determine sectors on which to perform data recovery, error scanning, or other error recovery operations. The scan list 234 may be stored in a memory, such as DRAM 212, additional memory 203, controller memory 208, or discs 209, and may be stored to a nonvolatile memory periodically, in response to a power event, in response to communications with a host, or for other reasons.

In some embodiments, the scan list 234 of sectors for which error recovery was aborted may be included as part of another list of sectors. For example, the DSD 200 may maintain a sector monitor list which identifies sectors at which read errors have occurred, and which may track a number of times errors occurred for each tracked sector. Even if data was eventually recovered from a sector, or no physical defects were detected, repeated errors may indicate that the sector is defective and should not be used. The scan list 234 may comprise a column of bits or flags added to the sector monitor list, with a set "early exit" bit or flag (e.g. a "1" value) indicating that early exit recovery occurred at the corresponding sector and that the sector has not received full error scan or data recovery operations. A "0" bit could indicate that an early exit did not occur for the associated sector, or that an early exit did occur but that additional error recovery operations have already been performed.

The DSD 200 may perform background operations, such as diagnostics scans, when the DSD 200 is idle (e.g. not servicing host operations, or when the DSD 200 is servicing host requests but has spare processing capacity to also perform background operations, etc.). Background operations may include performing error scanning and healing or repair operations. For example, the EMM 230 may access the scan list 234 to determine sectors for which error recovery operations were terminated early. The EMM 230 may initiate or resume error recovery operations on sectors in the scan list 234 as a background process. The error recovery operations may include attempting to read data stored to the sector (e.g. using different head offsets, decoding routines, etc.). If the data is successfully read, the error recovery operations may include writing the data back to the sector. A read-after-write operation may be performed to verify that the data can be read successfully after being rewritten. If the data cannot be read from the sector, operations may be performed to determine if the sector is defective. Operations may include writing data (e.g. a preset pattern of "junk" data) and reading the data back. If the sector fails the defect testing, an LBA associated with the sector may be remapped to another sector.

In some embodiments, the host 202 may query the DSD 200 regarding the scan list 234, or entries in the scan list 234. For example, software drivers or other instructions may be loaded to or executed by the host 202, directing the host 202 to periodically request a copy of the scan list 234, to request an indication of a number of entries on the scan list 234, or to otherwise query the DSD 200. In some embodiments, the host 202 may be configured to query the DSD 200 after a command from the host 202 to the DSD 200 failed, for example due to a low error recovery time limit.

The DSD 200 may be configured to respond to the host 202 query, for example by listing a number of entries on the scan list 234, by providing a copy of the scan list 234, by providing a list of LBAs from the scan list 234, by providing other information, or any combination thereof. The host 202 may use the provided information to determine whether or when to direct the DSD 200 to perform error recovery on sectors from the scan list. For example, the host 202 may select one or more LBAs from the list, and send a command to the DSD 200 to perform error recovery operations on the sectors associated with the selected LBAs. The host 202 may issue error recovery commands to the DSD 200 when the host 202 is in an idle state, when the host 202 determines that no new commands are scheduled to be sent to the DSD 200 for some selected period of time, during host background operations, at other times or conditions, or any combination thereof. In some embodiments, commands may be sent from the host 202 to the DSD 200 in the form of internal drive diagnostics (IDD) commands.

The host 202 may optionally transmit data for writing as part of an error recovery command. By receiving valid user or host data with the error recovery command, the DSD 200 may test the sector by writing valid data and attempting to read it back, instead of writing junk data. If successful, valid data can be recorded and error testing performed in a single operation, instead of writing junk data to test the sector, and then requiring a second operation to write the valid data. For example, the host 202 may communicate with multiple data storage devices, and may perform data mirroring between the devices (e.g. in a RAID or other distributed storage system). The host 202 may provide data from another drive to the DSD 200, to both test a target LBA or sector for errors and to mirror the data. The DSD 200 may write the provided data instead of junk data when performing defect testing on the sector.

Once the DSD 200 has completed error recovery operations on a sector (e.g. by performing error recovery operations without the error recovery time limit), the EMM 230 may remove the sector from the scan list 234. In some embodiments, the sectors may remain on a sector monitor list identifying sectors that have previously encountered errors, even if the sector was healed or determined to not be defective after the error recovery operations. An example of a scan list 234 is described in regard to FIG. 3.

Figure 3:
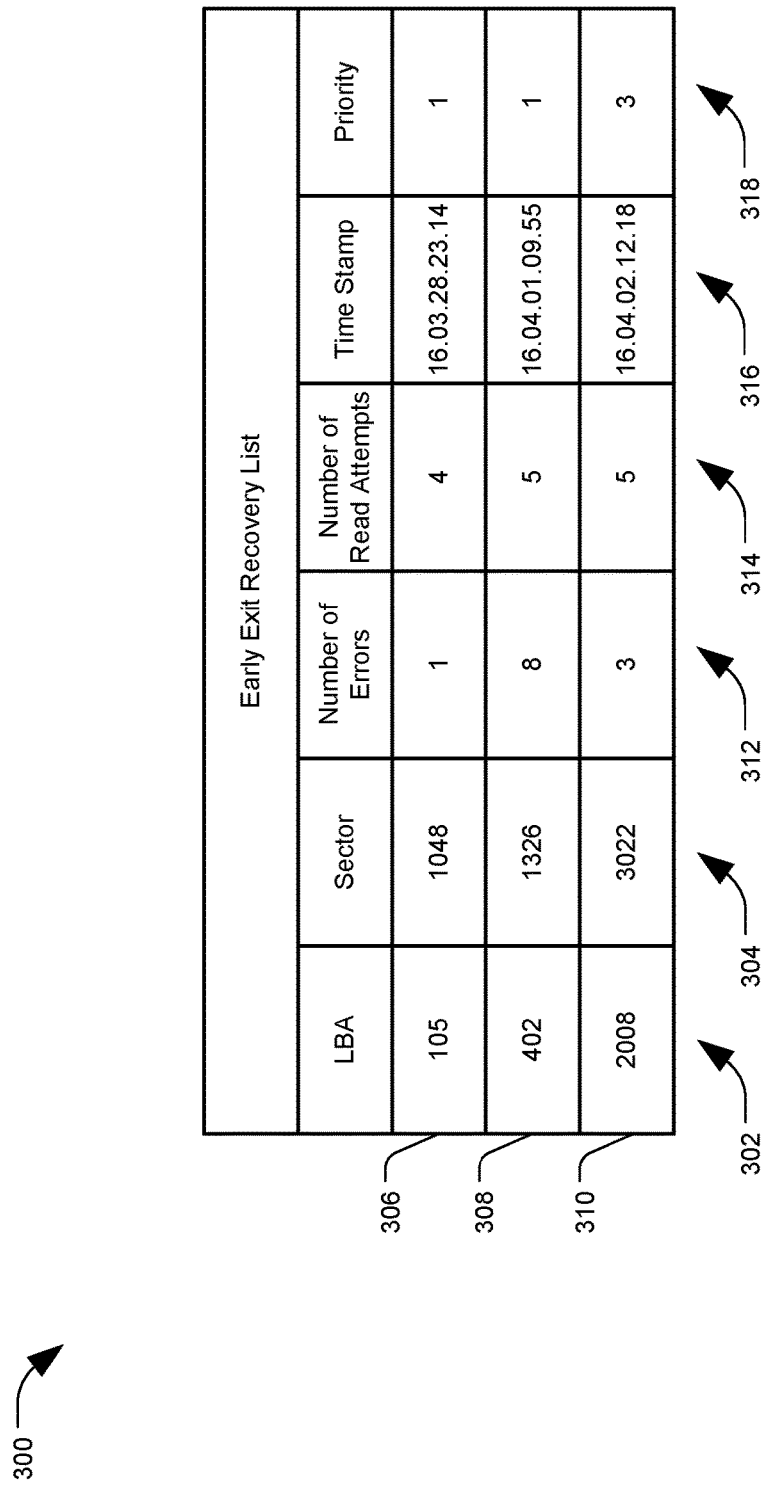
FIG. 3 is a diagram of table employed by a system configured to perform early termination error recovery, in accordance with certain embodiments of the present disclosure.

FIG. 3 is a diagram of table 300 employed by a system configured to perform early termination error recovery, in accordance with certain embodiments of the present disclosure. For example, table 300 may be utilized in systems 100, 200, or with any of the other systems or methods described herein. In particular, table 300 includes an early exit recovery list (EERL), which may be an example embodiment of a scan list 234 depicted in FIG. 2. The DSD may maintain and consult the EERL 300 to determine sectors on which to perform error recovery operations.

The EERL 300 may include a listing of information regarding sectors at which errors were encountered but for which error recovery operations were terminated before completing due to an error recovery time limit. Sectors or data sectors may refer to physical storage locations of a data storage medium. Information in the EERL 300 may include a list of sectors, logical block addresses (LBAs), other information, or any combination thereof.

The EERL 300 may include a column listing LBAs 302, and a column listing sectors 304. The configuration of the EERL may be different depending on the implementation of a given data storage device and the data mapping employed thereby. In some drive implementations, sectors may be statically mapped to LBAs, with the LBA corresponding to each sector remaining fixed, and each row of the EERL 300 may have the associated LBA and sector pair. In other drive implementations, the LBA to sector mapping may be dynamic, and the LBA mapped to any given sector may change dynamically during drive operation.

In the depicted embodiment, the first row 306 of the EERL 300 may include an entry having an LBA value of 105, and a sector value of 1048. The second row 308 may include an entry having an LBA value of 402, and a sector value of 1326. The third row 310 may include an entry having an LBA value of 2008, and a sector value of 3022. Although the sector values depicted in FIG. 3 are represented as a single integer value, in some embodiments the sector designation may be represented in other ways. For example, in some disc data storage devices, a sector may be represented as a cylinder-head-sector (CHS) value.

In addition to listing sectors, the EERL 300 may include other information. For example, the EERL 300 may include a time that the error was encountered 316, a number of errors encountered at the listed sector 312, information on what recovery operations had already been completed or a number of read attempts performed 314, or other information. A DSD may use the information on previously performed error recovery operations to avoid repeating error recovery operations at a sector. The EERL 300 may also include information identifying a priority value 318 associated with a command or sector, which value may be received from the host or associated with particular LBAs or sectors. For example, important system information may be marked as priority data, or data directed to LBAs reserved for system information may be classified as priority data by the DSD.

Instead of or in addition to using the EERL 300 internally to schedule error recovery operations, the DSD may be configured to transmit some or all of the EERL 300 to a host device. For example, the sector information 304 may be used internally by a DSD, and may not be relevant to a host device. A DSD may provide only a listing of the LBA information 302 to the host device, which the host may use to determine whether to order error recovery operations. The host device may direct the DSD to perform error recovery operations on all of the listed sectors or LBAs, specific sectors or LBAs, or none of the listed entries.

The information in the EERL 300 may be used by the DSD or a host to determine an order in which to perform error recovery operations on the listed LBAs. Error recovery operations may be performed in a simple top-down order, in a chronological order (e.g. oldest or newest first), or in any other order. High-priority entries may be addressed before lower-priority entries. For example, the DSD may prioritize entries based on which can be addressed the fastest, by determining the sector that can be reached in the shortest time based on a current position of a read head.

Depending on the implementation, the EERL 300 may be incorporated into other lists, such as a sector monitor list. An example sector monitor list with included early exit recovery data is described in regard to FIG. 4.

FIG. 4 is a diagram of table 400 employed by a system configured to perform early termination error recovery, in accordance with certain embodiments of the present disclosure. In particular, table 400 includes a sector monitor list (SML). The SML 400 may be used by a DSD to determine which sectors to retire due to encountering repeated errors at a given sector. The SML 400 may include an example embodiment of a scan list 234 depicted in FIG. 2. Table 400 may be utilized in systems 100, 200, or with any of the other systems or methods described herein.

The SML 400 may include a list or table of sectors maintained by a data storage device. In addition to sectors, the SML may include information regarding errors encountered at the sectors. In the depicted example embodiment, the SML 400 may include a sector column 402 listing a set of sector locations, an error counter column 404 listing a number of errors that have been encountered at the respective sector, and an early exit recovery column 406 including a flag or bit identifying whether the DSD cancelled recovery operations at the respective sector due to reaching an early exit recovery time limit. The early exit recovery flag may be a Boolean bit that identifies whether the sector 402 still needs to have error recovery operations performed. In some embodiments, the SML 400 may also include a recovery status field 408 indicating what recovery operations were performed prior to reaching the error recovery time limit, a counter for the number of times early exiting has occurred for the sector, other information, or any combination thereof.

A DSD may maintain the SML 400 to track sectors at which errors were encountered during command processing. When an error is encountered at a sector, the sector may be added to the sector monitor list 400, and a "1" value may be stored to the associated error counter value 404. Each time an error is encountered at the same sector, the error counter value 404 may be incremented. If a sector reaches a threshold number of errors, the sector may be decommissioned and marked as a defective sector, so that writes to the sector may be redirected to a spare sector located elsewhere on the storage medium.

The SML 400 may include the early exit recovery field 406. When an error is encountered at a given sector, in addition to incrementing the error counter field 404, a bit or flag in the early exit recovery field 406 may be set for the sector if error recovery operations were terminated early due to an error recovery time limit. The early exit recovery field 406 identifies whether additional error recovery operations should be performed at the corresponding sector. When a DSD needs to determine which sectors on which to perform error recovery operations, the DSD may consult the SML 400 and determine which sectors have the early exit recovery field 406 flag set (e.g. having a "1" or "true" value). The DSD may then perform error recovery operations on the associated sector when the drive is idle, in response to a host command to perform error recovery operations, or at some other point. When error recovery operations have been completed on a given sector, the early exit recovery field 406 for that sector may be set to "0" or "false."

The SML 400 may also include a recovery status column 408, which may indicate what error recovery operations have already been performed for a given sector prior to early exit recovery. When the DSD consults the SML 400 to determine sectors that have the early exit recovery bit 406 set, the DSD may also consult the recovery status field 408 to determine what recovery steps have already been performed and do not need to be performed again. For example, the DSD may employ a set of error recovery operations or processes to attempt to recover data from a sector; e.g. processes A through E. If, prior to reaching the error recovery time limit, the DSD had already performed processes A through C, the DSD may update the recovery status field 408 to indicate process C has already been attempted. When the DSD attempts further recovery operations later, it can resume recovery operations with process D. In some embodiments the DSD may perform the recovery processes in different orders for different errors or circumstances, rather than in the same order each time. In such cases, the DSD may store an indication in the recovery status field 408 for all processes attempted, rather than only the last process attempted. For example, the recovery status field 408 may include one bit for each type of error recovery operation available. Any operations that have already been attempted may be set to '1', while operations that were not attempted may be set to '0'.

SML 400 may include additional or different metadata or information, such as the fields discussed for the early exit recovery list 300 from FIG. 3.

Figure 5:
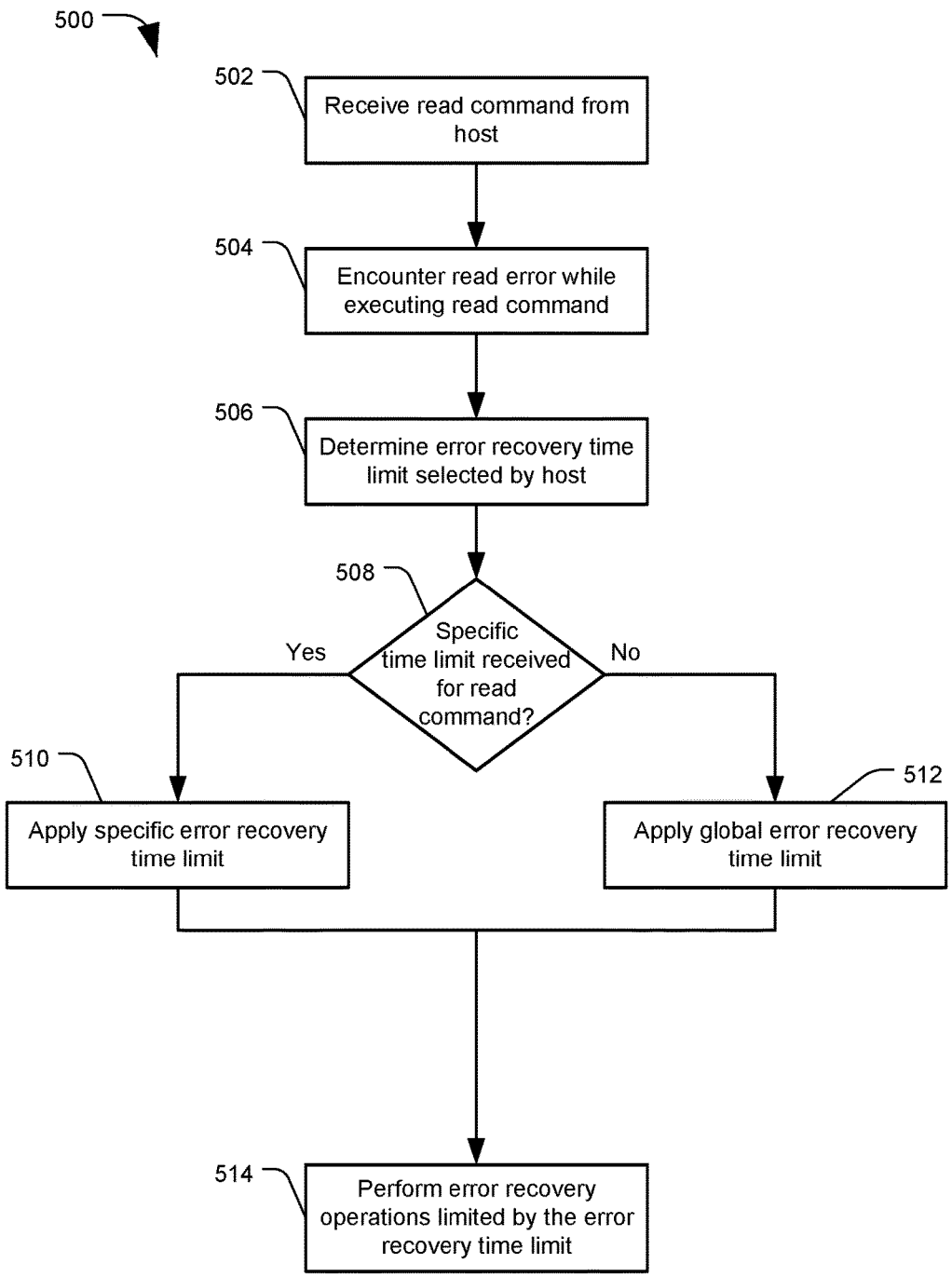
FIG. 5 is a flowchart of a method of early termination error recovery, in accordance with certain embodiments of the present disclosure.

Turning now to FIG. 5, a flowchart of a method 500 of early termination error recovery is shown, in accordance with certain embodiments of the present disclosure. In particular, the example method 500 may be directed to embodiments regarding read errors. The method 500 may be performed by a data storage device, such as DSDs of FIGS. 1 and 2.

The method 500 may include receiving a read command from a host device, at 502. The read command may include a command to read and return data stored to one or more LBAs of the DSD.

The method 500 may include encountering a read error while executing the read command, at 504. This can occur when a DSD has failed to read data from one or more sectors corresponding to LBAs identified in a read command, or the read data had too many errors for the DSD to correct during a first read attempt. In response to encountering a read error, the method 500 may include determining an error recovery time limit selected by the host, at 506. The host can select the error recovery time limit by including an indicator for the error recovery time limit as part of the read command sent to the DSD, or the host may send an indication to set an error recovery time limit separately from the read command. For example, the DSD may receive a global error recovery time limit indicator from the host separate from any input/output (I/O) command (i.e. not included with a read command or a write command), and may apply the global error recovery time limit to all I/O commands received from the host. Also, the DSD may receive specific error recovery time limits associated with a particular command from the host, which may be instead of or in addition to a global error recovery time limit set by the host. The host may include a specific error recovery time limit indicator (e.g. a value indicating a duration in seconds or milliseconds), or an indication of relative degree (e.g. shortest, short, average, long, longest, etc.). The indicator may be included along with an I/O command (e.g. the indicator contained in the I/O command structure itself or concatenated with the I/O command), or when setting a global time limit as an individual structured command. A DSD may have a plurality of error recovery time limit settings (e.g. four settings, with each setting corresponding to a specific time limit), and a host command may have a short bit length field allowing the host to select one of the time limit settings options (e.g. a two bit field to select from four settings).

At 508, the method 500 may include determining whether a time limit indicator specific to the read command was received for the command. For example, the time limit may be included with the read command itself (e.g. as a metadata field of a read command data packet), may be sent as a separate command that identifies the read command, may be set by a host for a limited number of commands (e.g. for the next five commands), or may otherwise be a limited scope time limit that applies to the read command. If there was a specific error recovery time limit, the method 500 may include applying the specific time limit, at 510. If no specific error recovery time limit was included with the read command or is determinative for the read command, at 508, the method 500 may include applying a global error recovery time limit, at 512.

After determining the error recovery time limit, the method 500 may include performing error recovery operations limited by the determined error recovery time limit, at 514. For example, the DSD may perform error recovery operations until the error is corrected or the time limit is reached, whichever occurs first. When the time limit is reached, the DSD may exit early from error recovery operations. In some embodiments, the DSD may perform error recovery operations until the DSD determines that no further error recovery operations may be completed within the time limit, and therefore may exit error recovery operations before the time limit has elapsed.

Figure 6:
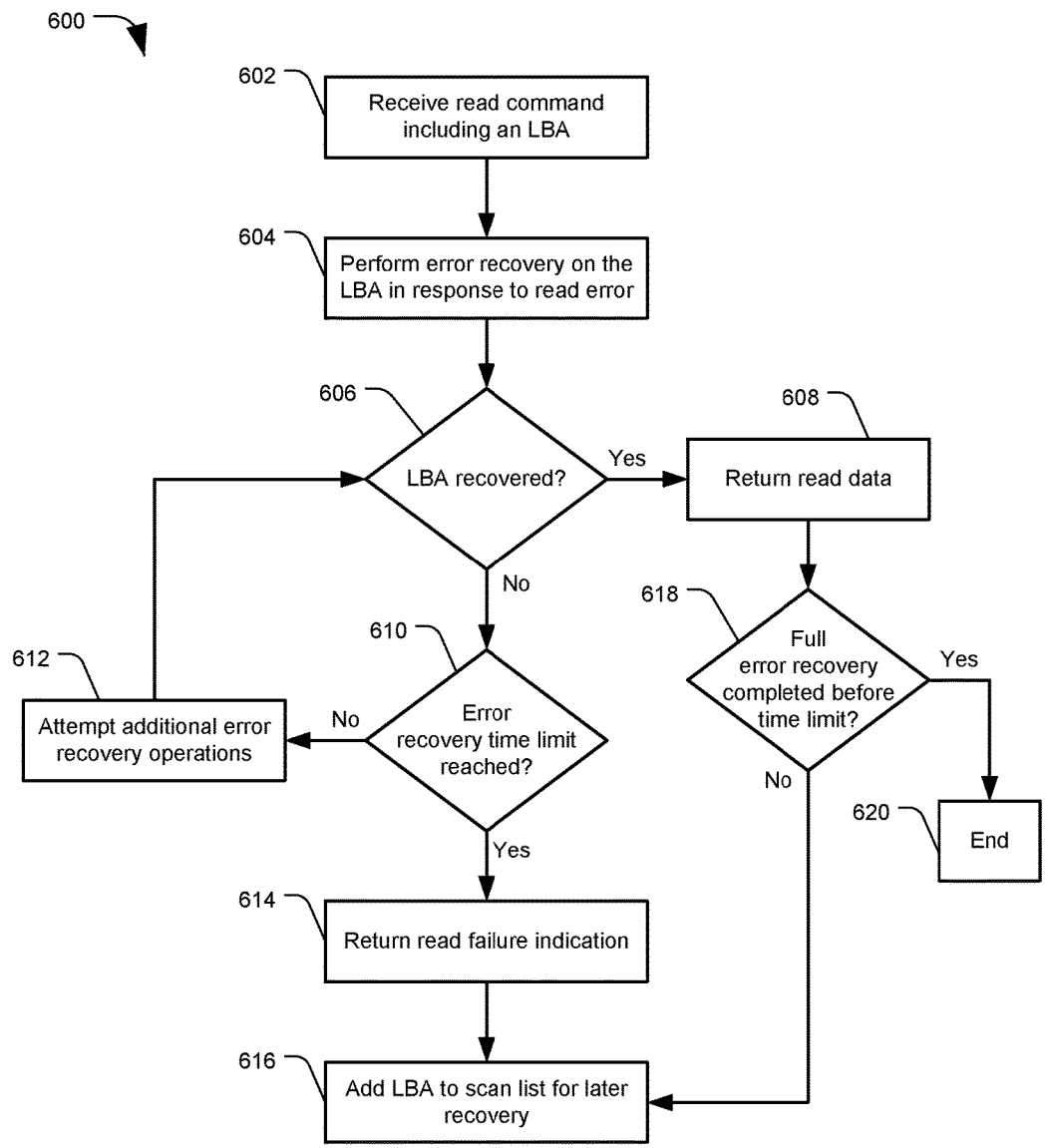
FIG. 6 is a flowchart of a method of early termination error recovery, in accordance with certain embodiments of the present disclosure.

FIG. 6 is a flowchart of a method 600 of early termination error recovery, in accordance with certain embodiments of the present disclosure. The method 600 may be performed during read operations by a data storage device, such as DSDs 104 and 200 of FIGS. 1 and 2, respectively.

Method 600 may include receiving a read command including an LBA from which to read requested data, at 602. A read error may be encountered at the LBA and, in response, the method 600 may include performing error recovery operations on a sector or other area associated with the read error, at 604.

At 606, the method 600 may include determining whether the data associated with the LBA was recovered during the error recovery operations. If the data was recovered, the data may be returned to the host (or other requesting device), at 608. The sector may be added to a sector monitor list (e.g. as in FIG. 4) based on the encountered error, whether or not the sector is scheduled for additional error recovery.

A DSD may be configured to perform additional error recovery or healing operations even if the data is recovered. For example, the data may be re-written to the sector, and may be re-read after re-writing, to attempt to improve the quality of the stored data. The physical sector may be determined to be unreliable despite the recovery, and the LBA and associated data may therefore be reallocated to a new spare sector. Accordingly, the method 600 may optionally include determining whether full error recovery has been or can be completed prior to reaching the error recovery time limit, at 618. Full error recovery may refer to a set of error recovery operations the drive is configured to perform in response to the specific nature of the encountered error, without regard to a time limit. If full error recovery was completed before reaching the time limit, the method 600 may end, at 620. If the recovered LBA or sector was already on a scan list, the sector may be removed from the list.

If full error recovery cannot be completed prior to reaching the error recovery time limit, at 618, the method 600 may include adding the LBA or sector to a scan list for later recovery operations, at 616. An error indicator may optionally be sent to the host, e.g. instead of or in addition to the recovered data. For example, the DSD may provide the recovered data to the host, at 608, but also notify the host that recovery operations were not completed and that additional operations may need to be performed at the sector. The host may use this information to schedule error recovery operations at the DSD, to know whether to poll the DSD regarding sectors on a scan list, to direct future requests for that LBA to another storage device, for other purposes, or any combination thereof.

If the data was not recovered, at 606, the method 600 may include determining whether an error recovery time limit has been reached, at 610. The method may include determining what error recovery operations can be performed before the error recovery time limit is reached at 610, rather than simply checking if the time limit has expired. For example, the drive may determine an estimated amount of time each potential error recovery operation may take to perform based on an expected number of disc rotations or other factors. The drive may select operations to perform based on which operations can be completed prior to the error recovery time limit expiring, based on operations most likely to succeed prior to the limit expiring, based on other factors, or any combination thereof. An example listing of error recovery processes and associated time requirements that a DSD may employ during an error recovery process is described below in regard to FIG. 10.

If the error recovery time limit has not been reached or additional operations may be performed prior to reaching the limit, at 610, additional error recovery operations may be attempted, at 612. The method 600 may then return to determining if the error recovery was successful, at 606.

If the error recovery time limit was reached, or no additional recovery operations may be performed prior to reaching the time limit, at 610, a read failure indication may be returned in response to the read command, at 614 (e.g. to the host issuing the command). The LBA or sector at which the error was encountered may also be added to a scan list for later error recovery operations, at 616. If the sector was already on the scan list, the scan list may be updated with new time stamps, an incremented error counter, or other information. The DSD may perform error recovery on the sector or LBA when the DSD is idle, in response to an error recovery command from the host, or based on some other trigger.

Figure 7:
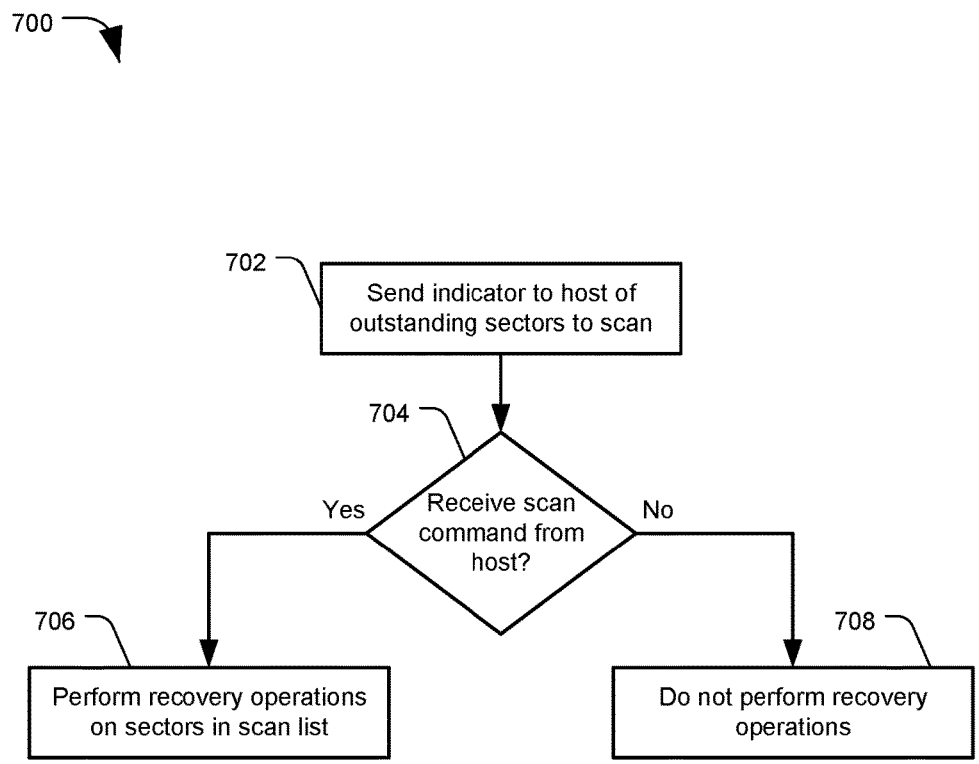
FIG. 7 is a flowchart of a method of early termination error recovery, in accordance with certain embodiments of the present disclosure.

FIG. 7 is a flowchart of a method 700 of early termination error recovery, in accordance with certain embodiments of the present disclosure. The method 700 may be performed by a data storage device, such as DSDs 104 and 200 of FIGS. 1 and 2, respectively.

Method 700 may include sending an indicator to a host device of outstanding sectors to scan, at 702. The DSD may send the indicator to the host in response to a query from the host requesting information regarding sectors that require error scanning. Scanning may include performing error recovery operations to completion, without early termination due to an error recovery time limit. The outstanding sectors to scan may be sectors for which error recovery operations were terminated early due to an error recovery time limit, such as sectors stored to a scan list 234 of FIG. 2. In some embodiments, a DSD may not identify specific LBAs or sectors, but may indicate a number of sectors on a scan list, or merely that there are outstanding sectors to scan on a scan list.

Method 700 may include determining whether a scan command has been received from the host, at 704. The host may command the DSD to perform error recovery operations on sectors in a scan list, without specifying any specific sectors or LBAs to scan. Alternately, the host may direct the DSD to perform error recovery operations on specific LBAs, for example if the DSD had provided the host with a list of LBAs that required scanning.

If a scan command was received from the host, the method 700 may include performing recovery operations on sectors in the scan list, at 706. Error recovery operations may be performed on specific sectors or LBAs identified by the host, on all sectors in the scan list, on the oldest entries in the scan list, or according to other criteria. The host may identify an LBA to scan as well as providing data associated with that LBA. For example, the host may retrieve data corresponding to the LBA from a mirrored data backup, or rebuild the data from a RAID (redundant array of independent discs) stripe across other drives. The DSD could then attempt writing the sector with the data from the host as part of a write-verify operation. Without data from a host, the DSD may perform a write-verify operation using junk data, or may perform other error recovery operations.

If a scan command was not received from the host, at 704, the method 700 may include not performing recovery operations, at 708. For example, the DSD may only perform error recovery operations on sectors in response to a scan command from the host, outside of error recovery operations performed in the course of executing I/O commands. The DSD may also perform error recovery operations without a host command as a background operation when the DSD is idle.

Figure 8:
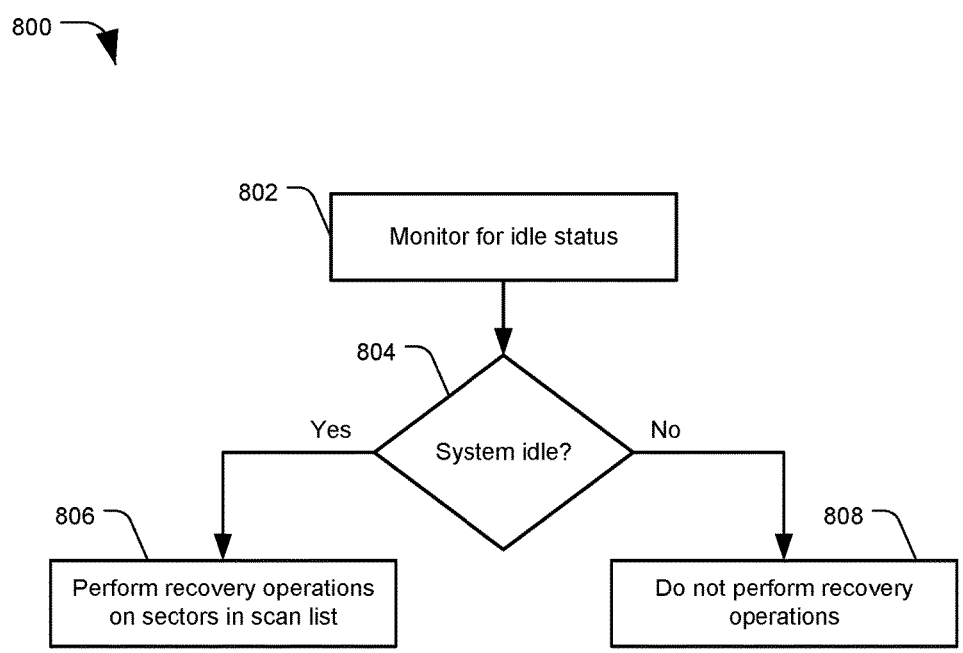
FIG. 8 is a flowchart of a method of early termination error recovery, in accordance with certain embodiments of the present disclosure.

FIG. 8 is a flowchart of a method 800 of early termination error recovery, in accordance with certain embodiments of the present disclosure. The method 800 may be performed by a data storage device, such as DSDs 104 and 200 of FIGS. 1 and 2, respectively.

Method 800 may include monitoring for idle status at a data storage device (DSD), at 802, and at 804 a determination may be made as to whether the system is idle. The DSD may be in an idle status when no host commands are being processed, when no host commands have been received for a selected period of time, when less than a threshold processing capacity of the DSD is being directed to processing host commands or DSD operations having a higher priority than error scanning, when a storage medium of the DSD is not being accessed, based on other criteria, or any combination thereof.

If a determination is made that the system is idle, at 804, the DSD may perform recovery operations on sectors in the scan list, at 806. The recovery operations may be operations in addition to, or repeats of, previous recovery operations that were performed at the locations in the scan list. For example, if the DSD did not complete all available error recovery operations for a specific sector, recover the data, or determine the sector's reliability prior to reaching an error recovery time limit, the DSD may return to performing error recovery operations during an idle period.

If the system is not determined to be idle, at 804, the method 800 may include not performing error recovery operations, at 808. The DSD may wait to perform error recovery operations until the system is idle so that host commands are not delayed due to the error recovery operations, so that the error recovery operations are not interrupted to service host commands, to avoid other processing conflicts, or any combination thereof.

Figure 9:
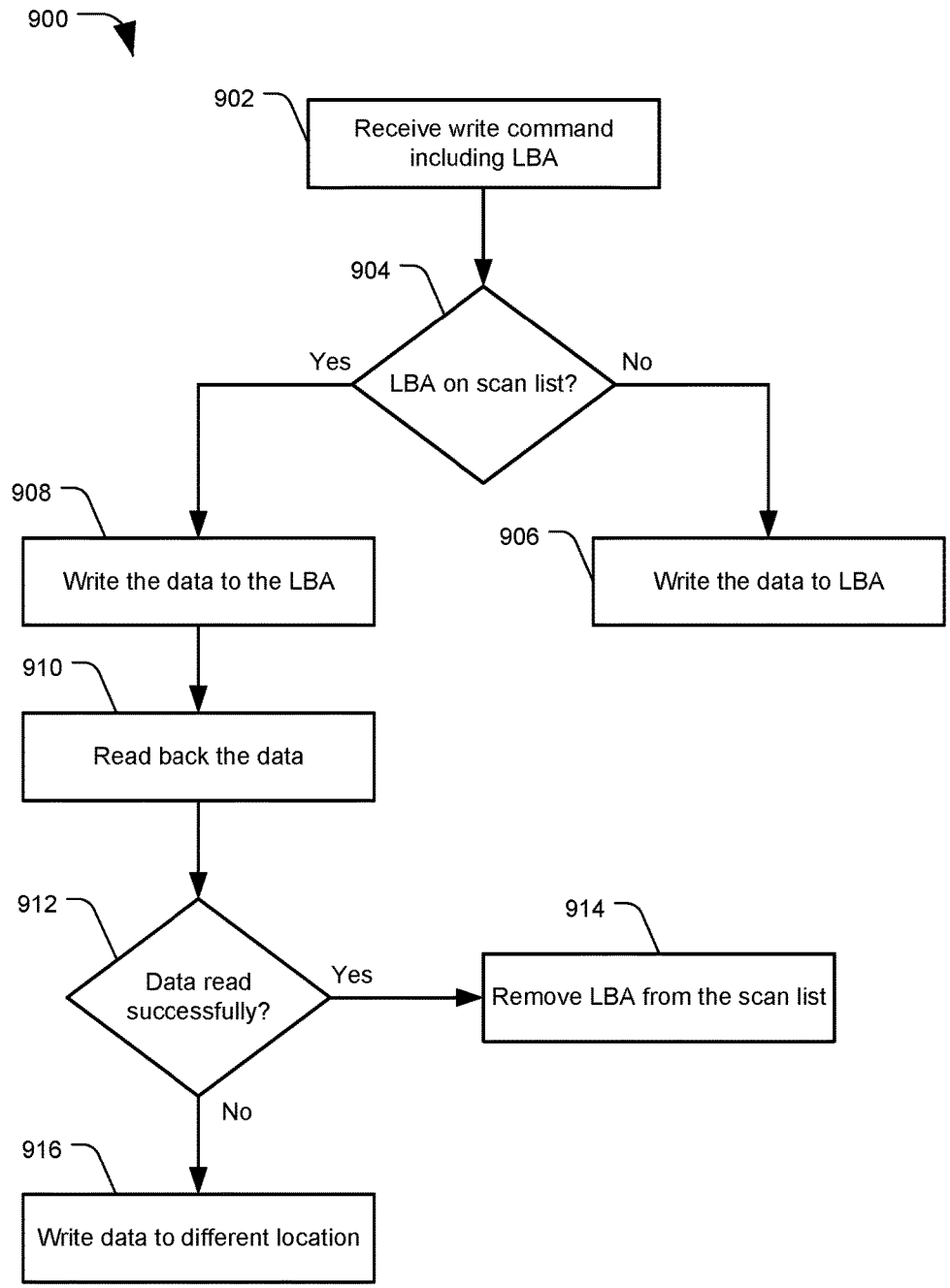
FIG. 9 is a flowchart of a method of early termination error recovery, in accordance with certain embodiments of the present disclosure.

FIG. 9 is a flowchart of a method 900 of early termination error recovery, in accordance with certain embodiments of the present disclosure. The method 900 may be performed by a data storage device, such as DSDs 104 and 200 of FIGS. 1 and 2, respectively.

Method 900 may include receiving a write command from a host, at 902. The write command may include data to write and an LBA associated with the data. The DSD may translate the LBA to a physical storage location, such as a sector of a data storage medium, for example using a mapping table.

Method 900 may include determining whether the LBA or the associated sector is on a scan list for the DSD, at 904. Since errors have been encountered at the listed sectors, but sufficient error recovery has not been performed to determine whether the sectors are defective, writes to sectors on the list may be unreliable.

If the LBA is not on the scan list, at 904, the DSD may write the data to the LBA, at 906, and may transmit a write complete indication to the host. If the LBA is on the scan list, however, the DSD may write the data to the LBA, at 908, and then read back the written data, at 910, in a write-verify operation. Reads subsequent to the write may differ from standard read operations. For example, lower error correction thresholds may be applied (i.e. the DSD may be set to correct a lower number of errors than the drive is capable of correcting, to apply a more stringent test of the write quality). Lower correction thresholds may be applied by adjusting the error correction code (ECC) or low-density parity check (LDPC) operations. Fewer read retries may be performed, or the error correction on the reads may otherwise be limited.

The method 900 may include determining whether the data was read back successfully, at 912. If the data was read back successfully, the method 900 may include removing the LBA or associated sector from the scan list, at 914. Since valid data was written to the sector and read back successfully, the DSD may determine that the sector is not defective, and that there is no need to keep the sector on the scan list. Alternately the sector may be kept on a sector monitor list used to determine sector defects due to numerous encountered errors, but an "early exit" flag for the sector may be set to "0" to indicate further error scanning is not required.

If the data was not read back successfully, at 912, the data may be written to a different location, at 916. For example, the DSD may determine that the sector is defective, and may remap the LBA to a different physical sector. The data may be temporarily stored to a media cache or other location before selecting or storing the data to an alternate permanent storage location. In some embodiments, the method 900 may include retrying writing or reading the data one or more times to the original destination or a new reassigned sector before remapping the LBA.

When data is stored to a new sector, the DSD may recalculate super parity data for sectors at the track of the original target sector. Super parity data may be metadata distributed across an entire track, zone, or other area that can be used to reconstruct lost data. When data is remapped to a new sector, it may require recalculating and re-storing the super parity data.

In some embodiments, a DSD may write data to a sector included on the scan list in response to a write command, and may remove the sector from the scan list without reading the data back first. In another implementation, a DSD may be configured to write data to a sector without reading the data back, but may leave the sector on the scan list to perform error testing at a later time (e.g. not while a read or write command is pending). Different embodiments may be selected based on a desired response time to host commands, or based on other considerations.

FIG. 10 is a diagram of table 1000 employed by a system configured to perform early termination error recovery, in accordance with certain embodiments of the present disclosure. Table 1000 may include an error recovery process list (ERPL) used by a data storage device (DSD) to select error recovery operations to perform in response to encountering a read or write error. In some embodiments read error recovery operations may be listed in a separate table from write error recovery operations, or they may be stored to different portions of the same table.

The ERPL 1000 may include a listing of error recovery processes 1002 available to a DSD. Example error recovery processes 1002 may include simple retry attempts, adjusting head offset values, modifying read or write channel parameters, data reconstruction using parity bits, other operations, or any combination thereof. The error recovery processes 1002 of FIG. 10 are identified as process A through process E, but more or fewer processes may be available to a DSD.

The ERPL 1000 may also include a listing of some metric used to calculate completion time of each error recovery process 1002, such as a required number of disc revolutions 1004. For example, an error management module (EMM) of the DSD may have information on a time required to complete a disc revolution when the disc is fully spun up. The EMM can multiply the time to complete each revolution by a number of disc revolutions 1004 required for an error recovery process 1002 to determine an amount of time required to complete that process. Different or additional values may be stored, such as a set estimated time to perform an error recovery process 1002 rather than a number of revolutions. While the ERPL 1000 is depicted in FIG. 10 as a table, a DSD may obtain the information for calculating recovery operation times from other sources.

When a DSD encounters an error while executing a command, the EMM may determine an amount of time remaining until reaching an error recovery time limit. The EMM may then determine what error recovery operations may be performed prior to reaching the error recovery time limit by accessing the ERPL 1000. For example, if a disc rotation takes approximately 12 milliseconds, the EMM may multiply that value by the number of disc revolutions listed in column 1004 to determine a time duration for each error recovery operation. Process A may require 12 milliseconds (1 revolution multiplied by 12 milliseconds), process B may require 36 milliseconds, etc. If 60 milliseconds remain before reaching the error recovery time limit, the EMM may select one or more error recovery processes 1002 to perform that may be completed before the 60 millisecond error recovery time limit expires.

The EMM may start at the top of the ERPL 1000 and work down, e.g. attempt process A first, then process B, then process C, etc. Process A may require 12 milliseconds, and process B may require 36 milliseconds. After performing processes A and B, 48 milliseconds may have been used, so the EMM may not have sufficient time to perform process C, which requires an additional 24 milliseconds. The EMM may end error recovery operations even though approximately 12 milliseconds remain, send a command failure notice to the host, and add the error sector to a scan list.

In some embodiments, the EMM may select error recovery processes 1002 to perform in a different order. For example, the EMM may determine a combination of processes 1002 that best utilize the time left in the error recovery time limit, or the processes most likely to successfully recover the data before the time limit expires. For example, with a 60 millisecond time limit, the EMM may select processes B (36 milliseconds) and C (24 milliseconds), consuming 60 milliseconds, and skip process A. EMM may alternately select process D, consuming a full 60 milliseconds by itself, and not attempt other recovery methods.

Which recovery processes 1002 are selected by the EMM may depend on the nature of the error encountered, the severity of the error encountered, or other factors. For example, the DSD may determine a number of bit errors encountered when reading a sector, and may determine how to proceed based on different bit error thresholds. If the DSD can normally correct five bit errors from a read sector based on the error correction codes (ECC) for the sector, encountering seven or fewer bit errors may suggest that a simple retry operations should be performed. If a large number of errors are encountered (e.g. fifteen), the EMM may determine that retries should be skipped and data reconstruction from parity bits should be performed first.

The embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:
1. An apparatus comprising:
   a controller configured to:
      receive an indication from a host via a host interface circuit specifying an error recovery time limit to be applied by the controller;
      access a memory to execute a read command from the host at a physical storage location of the memory associated with the read command;
      perform one or more error recovery operations in response to encountering a read error while executing the read command;
      cancel the one or more error recovery operations based on reaching the error recovery time limit specified by the host;
      add the physical storage location to a scan list based on reaching the error recovery time limit, the scan list including a list of physical storage locations on which to perform additional error recovery operations on a deferred basis; and perform the additional error recovery operations for the physical storage location based on the scan list.

2. The apparatus of claim 1 comprising the controller further configured to:
perform the additional error recovery operations at the physical storage location subsequent to returning a failure indicator to the host for the read command.

3. The apparatus of claim 1 comprising the controller further configured to:
receive a logical block address (LBA) with the read command and associated with the physical storage location; and
add the LBA to the scan list based on reaching the error recovery time limit.

4. The apparatus of claim 1 comprising the controller further configured to:
provide information regarding the scan list to the host;
receive an error recovery command from the host to perform error recovery operations on a physical storage location from the scan list; and
perform the additional error recovery operations on the physical storage location based on the error recovery command.

5. The apparatus of claim 1 comprising the controller further configured to:
determine when the apparatus is in an idle state; and
perform the additional error recovery operations on physical storage locations from the scan list based on the apparatus being in an idle state.

6. The apparatus of claim 1 comprising the controller further configured to:
determine a time required to perform error recovery operations available to the apparatus; and
select the one or more error recovery operations to perform from the error recovery operations available to the apparatus based on the determined time required and the error recovery time limit.

7. The apparatus of claim 1 comprising the controller further configured to:
maintain a monitor list of physical storage locations at which errors have been encountered to determine defective sectors to decommission; and
the scan list includes an early exit flag bit field of the monitor list, a set early exit bit flag indicating that a corresponding physical storage location had error recovery operations cancelled based on reaching the error recovery time limit.

8. The apparatus of claim 1 comprising the controller further configured to:
receive the indication from the host to set the error recovery time limit as a global error recovery time limit for all read commands received from the host; and
set the error recovery time limit based on the received indication.

9. The apparatus of claim 1 comprising the controller further configured to:
receive, included with the read command from the host, the indication to set the error recovery time limit for the read command.

10. The apparatus of claim 1 further comprising:
receive a write command from the host;
perform the one or more error recovery operations in response to encountering a write error while executing the write command; and
cancel the one or more error recovery operations based on reaching the host-selected error recovery time limit.

11. The apparatus of claim 1 comprising the controller further configured to:
receive a write command directed to the physical storage location on the scan list;
write data from the write command to the physical storage location;
read back the data from the physical storage location;
remove the physical storage location from the scan list when the data is read back successfully; and
write the data to a different location when the data is not read back successfully.

12. A memory device storing instructions that, when executed, cause a processor to perform a method comprising:
receiving an indication from a host via a host interface circuit specifying an error recovery time limit to apply in executing at least one command from the host;
setting the error recovery time limit to apply based on the received indication;
receiving a command from the host;
accessing a memory device to execute the command;
performing one or more error recovery operations in response to encountering an error while executing the command;
terminating the one or more error recovery operations when the error recovery time limit specified by the host is reached prior to completion of the one or more error recovery operations;
adding a physical storage location corresponding to the error to a scan list based on reaching the error recovery time limit, the scan list including a list of physical storage locations on which to perform additional error recovery operations on a deferred basis; and
performing the additional error recovery operations by selecting the physical storage location from the scan list.

13. The memory device of claim 12, the method further comprising:
providing information regarding the scan list to the host;
receiving an error recovery command from the host to perform the additional error recovery operations on a selected physical storage location from the scan list; and
performing the additional error recovery operations based on the error recovery command.

14. The memory device of claim 12, the method further comprising:
determining when the memory device is in an idle state; and
performing the additional error recovery operations on physical storage locations from the scan list based on the memory device being in an idle state.

15. The memory device of claim 12, the method further comprising:
receiving a write command directed to the physical storage location corresponding to the error;
writing data from the write command to the physical storage location;
reading back the data from the physical storage location;
removing the physical storage location from the scan list when the data is read back successfully; and
writing the data to a different location when the data is not read back successfully.

16. The memory device of claim 12, the method further comprising:

receiving the indication from the host to set the error recovery time limit as a global error recovery time limit for all read commands received from the host; and setting the error recovery time limit based on the received indication.

17. A method comprising:

receiving a command from a host at a data storage device via a host interface circuit;

receiving an indication from the host via the host interface circuit specifying an error recovery time limit for the data storage device to apply when executing the command;

accessing a memory device to execute the command;

performing one or more error recovery operations at the data storage device in response to encountering an error while executing the command;

terminating the one or more error recovery operations when the error recovery time limit specified by the host is reached prior to completion of the one or more error recovery operations;

adding a physical storage location corresponding to the error to a scan list based on reaching the error recovery time limit, the scan list including a list of physical storage locations on which to perform delayed error recovery operations; and performing the additional error recovery operations by selecting the physical storage location from the scan list.

18. The method of claim 17 further comprising:

performing the one or more error recovery operations while executing the command includes:

determining whether a next recovery operation will complete prior to the error recovery time limit;

executing the next recovery operation when the next recovery operation will complete prior to the error recovery time limit; and terminating the one or more error recovery operations when the next recovery option will not complete prior to the error recovery time limit.

19. The method of claim 17 further comprising:

providing an indication of the scan list to the host;

receiving an error recovery command from the host to perform the delayed error recovery operations on a physical storage location from the scan list; and performing the delayed error recovery operations based on the error recovery command.

20. The method of claim 19 further comprising:

receiving host data included with the error recovery command;

writing the host data to the physical storage location; and reading the host data from the physical storage location to test the physical storage location for defects.

* * * * *